US007878003B1

(12) United States Patent
Smith

(10) Patent No.: US 7,878,003 B1
(45) Date of Patent: Feb. 1, 2011

(54) FUEL CONTROL SYSTEM FOR GAS TURBINE ENGINE REHEAT APPARATUS

(75) Inventor: Trevor Stanley Smith, Sutton Coldfield (GB)

(73) Assignee: Goodrich Control Systems Limited, Luton, Bedfordshire (GB)

( * ) Notice: Subject to any disclaimer, the term of this patent is extended or adjusted under 35 U.S.C. 154(b) by 0 days.

(21) Appl. No.: 06/887,530

(22) Filed: Jul. 14, 1986

(30) Foreign Application Priority Data

Jul. 12, 1985 (GB) .................................... 8517745

(51) Int. Cl.
*F02K 3/10* (2006.01)
(52) U.S. Cl. ....................................................... 60/764
(58) Field of Classification Search .................. 60/241, 60/243, 233, 261, 39.281, 764; 364/431.02
See application file for complete search history.

(56) References Cited

U.S. PATENT DOCUMENTS 3,857,241 A * 12/1974 Lewis ........................... 60/241
3,874,170 A *  4/1975 Lewis ........................... 60/241
3,937,014 A *  2/1976 Plant ............................ 60/241
3,977,187 A *  8/1976 Guillaume .................... 60/241
4,175,383 A * 11/1979 Smith ....................... 60/39.281
4,229,939 A * 10/1980 Smith ........................... 60/243

* cited by examiner

*Primary Examiner*—Timothy D Collins
*Assistant Examiner*—Joseph W Sanderson
(74) *Attorney, Agent, or Firm*—Finnegan, Henderson, Farabow, Garrett & Dunner, L.L.P.

(57) ABSTRACT

A fuel control system for a gas turbine engine reheat system has a plurality of fuel metering devices for controlling fuel flow to respective ones of the reheat burners, and a plurality of throttle valves in series with the respective metering devices. One of the throttle valves regulates a pressure difference across its associated metering device and the remaining throttle valves maintain the pressure difference across their respective metering devices equal to that controlled by the aforesaid one throttle valve. The system may include a fuel supply valve which is responsive to a pressure signal controlled by two of the metering devices so that fuel supply from a pump is provided only when both of the two metering devices are open. The pump may include a delivery pressure regulating arrangement responsive to pump delivery pressure and to the highest of the pressures downstream of the metering devices, for regulating pump delivery pressure so as to maintain the metering pressure differences constant.

8 Claims, 8 Drawing Sheets

FUEL CONTROL SYSTEM FOR GAS TURBINE ENGINE REHEAT APPARATUS

Figure 1:
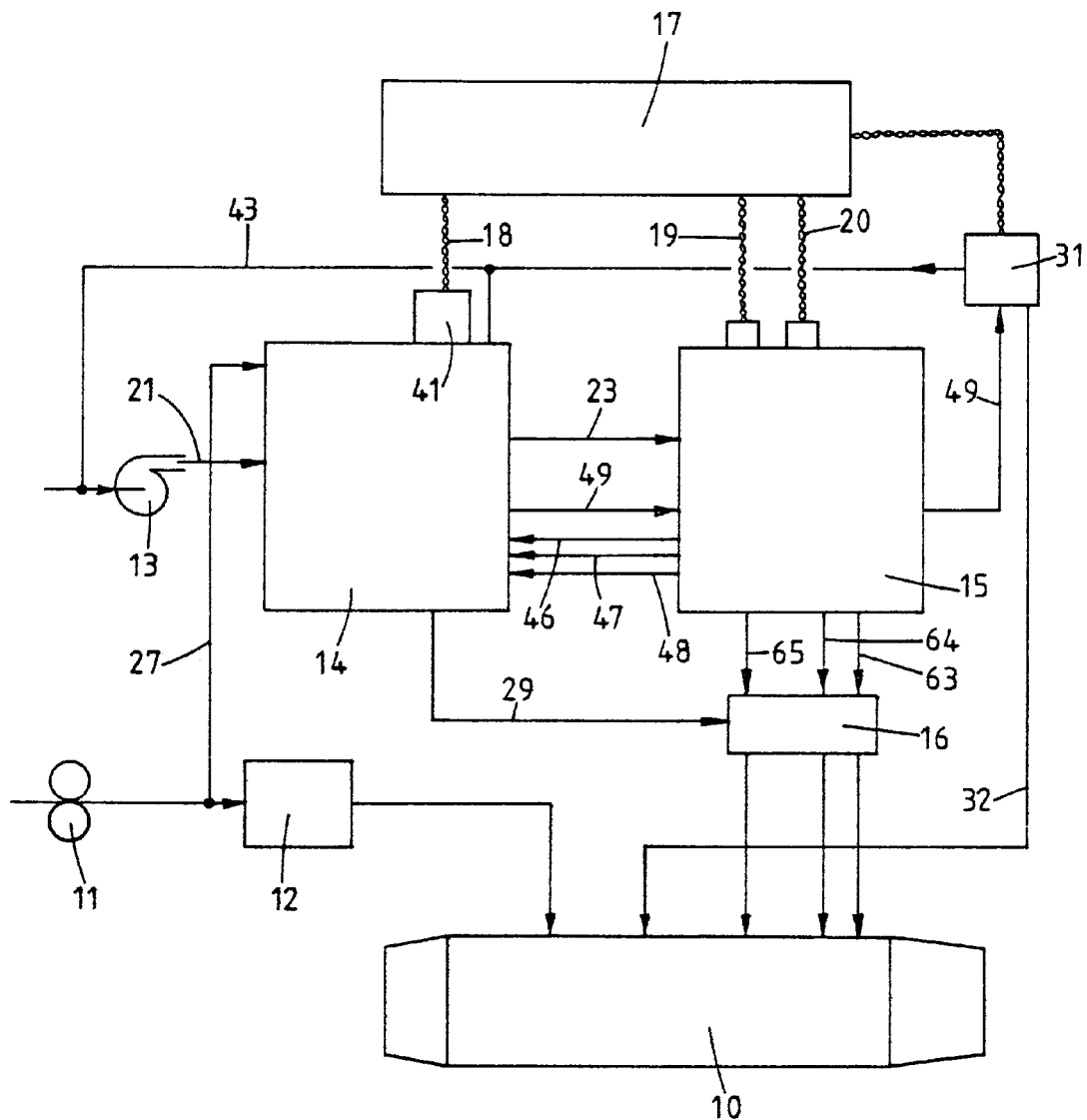

This invention relates to a system for controlling flows to the burners of a gas turbine engine reheat apparatus. Gas turbine engine reheat apparatus typically comprises three separate concentrically arranged burners, the burners in the hotter and cooler gas streams being referred to as the core and bypass burners respectively, and a third primary burner which provides a pilot flame. It is required to control fuel flow to the individual burners. British Patent 1456976 discloses an arrangement in which separate flow control valves for the respective burners are operated by electrical actuators which are in turn responsive to signals from an electronic control circuit, and in which a pump for supplying fuel to the system is arranged to increase its fuel delivery in response to the lowest of the pressure differences across the respective flow control valves.

It is desired that the metering pressure differences across the control valves shall be maintained substantially equal to each other, and the present invention provides a system in which this is achieved.

In the above patent the fuel supply pump has an inlet throttle which is responsive to a servo pressure, the servo pressure being responsive to the aforesaid metering pressure difference. It is desirable that response of the pump inlet throttle to changes in the metering pressure difference shall be as rapid as possible. The prior art servo pressure is an intermediate pressure regulated by a servo pressure control valve which is responsive to the metering pressure difference. The present invention provides an improved response of the pump inlet throttle by applying a metered pressure directly to a control element of the inlet throttle, to urge the throttle open, so that an increase in the metered pressure, indicative of a decrease in the metering pressure difference, increases flow from the pump to restore that pressure difference to its original level. The use of a biasing spring in the inlet throttle is avoided by providing a servo pressure regulating valve which is movable in response to changes in pump delivery pressure from a shut position to apply selectively either the pump delivery pressure or a low pressure to the inlet throttle, in opposition to the metered pressure.

In alternative arrangements a shut-off valve is provided in a fuel supply line to the metering control valves, this shut off valve being responsive to a servo pressure applied as a result of at least one of the metering control valves to an open position. The shut-off valve is therefore not opened until at least one of the control valves has been opened by a signal from the electronic control circuit.

According to the invention a system for controlling fuel flow to each of a plurality of reheat burners of a gas turbine engine comprises a plurality of metering devices for regulating fuel flow to the respective burners, and a corresponding plurality of throttle valves in series with respective ones of said devices, one of said throttle valves including means for regulating flow in response to a metering pressure difference across the one metering device with which it is in series, for maintaining said pressure difference substantially constant, the remaining throttle valves being directly responsive to the pressure difference across said one metering device, for maintaining the pressure difference across the remaining devices substantially equal to that across said one device.

According to another aspect of the invention a fuel supply system for a gas turbine engine, comprises a fuel metering valve, a fuel supply passage communicating with an inlet of said metering valve, a shut-off valve for controlling flow through said supply passage, means responsive to a servo pressure signal for opening said shut-off valve, and means operable by said metering valve in an open position thereof, for supplying said servo pressure signal.

According to a further aspect of the invention a fuel control system includes a fuel pumping unit and a unit for metering fuel flow from the pumping unit, said pumping unit including a pump, a throttle valve for increasing or decreasing flow through the pump in response to pressures in first and second chambers respectively, means for deriving the pressure in said first chamber from a pressure downstream of said metering unit, and a shuttle valve for regulating pressure in said second chamber in response to pressure at the outlet of said pump, said shuttle valve having ports communicating with said second chamber and with a low pressure connection respectively, a shuttle movable against a biasing spring and the pressure in said second chamber by the pressure in said pump outlet, both of said ports being shut in an equilibrium position of said shuttle.

An embodiment of the invention will now be described by way of example only and with reference to the accompanying drawings in which:—

Figure 2:
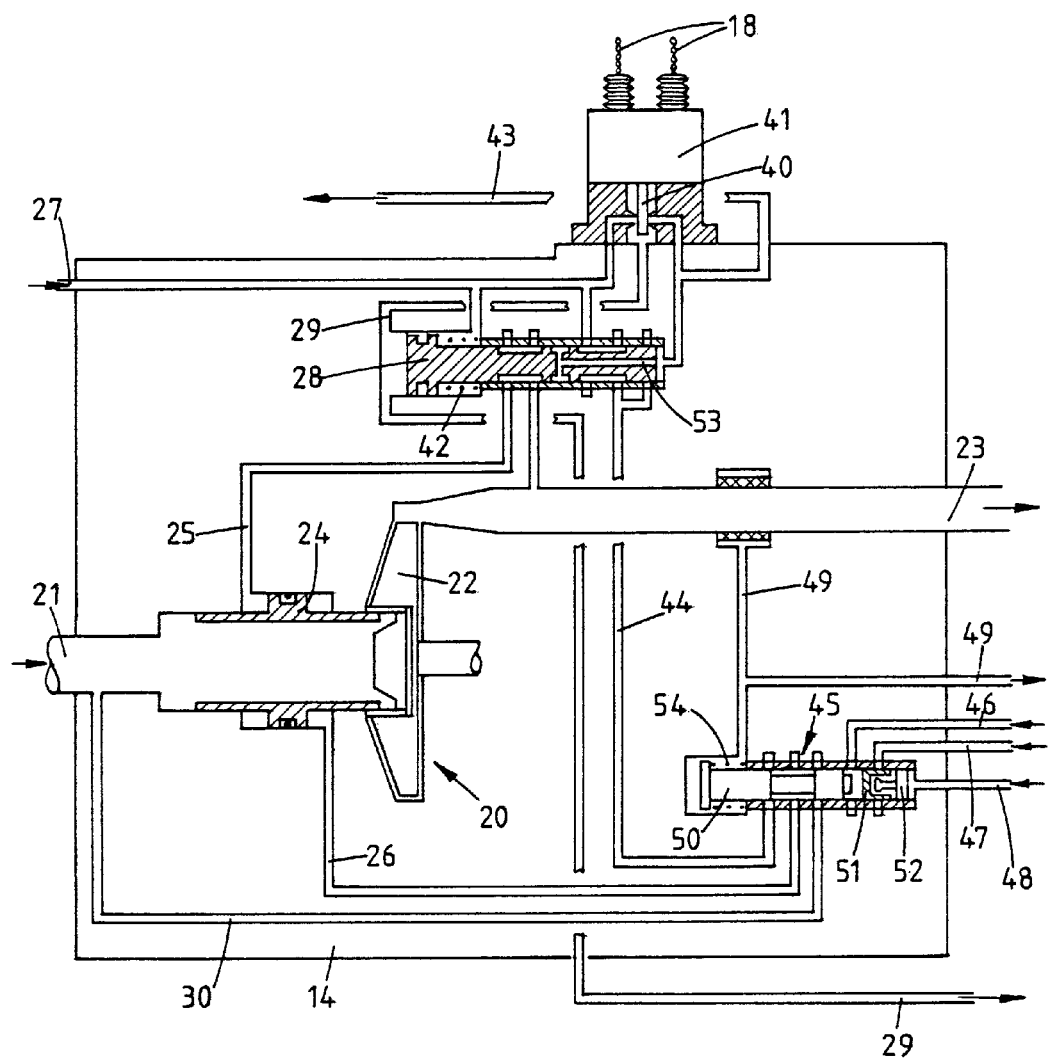
Figure 3:
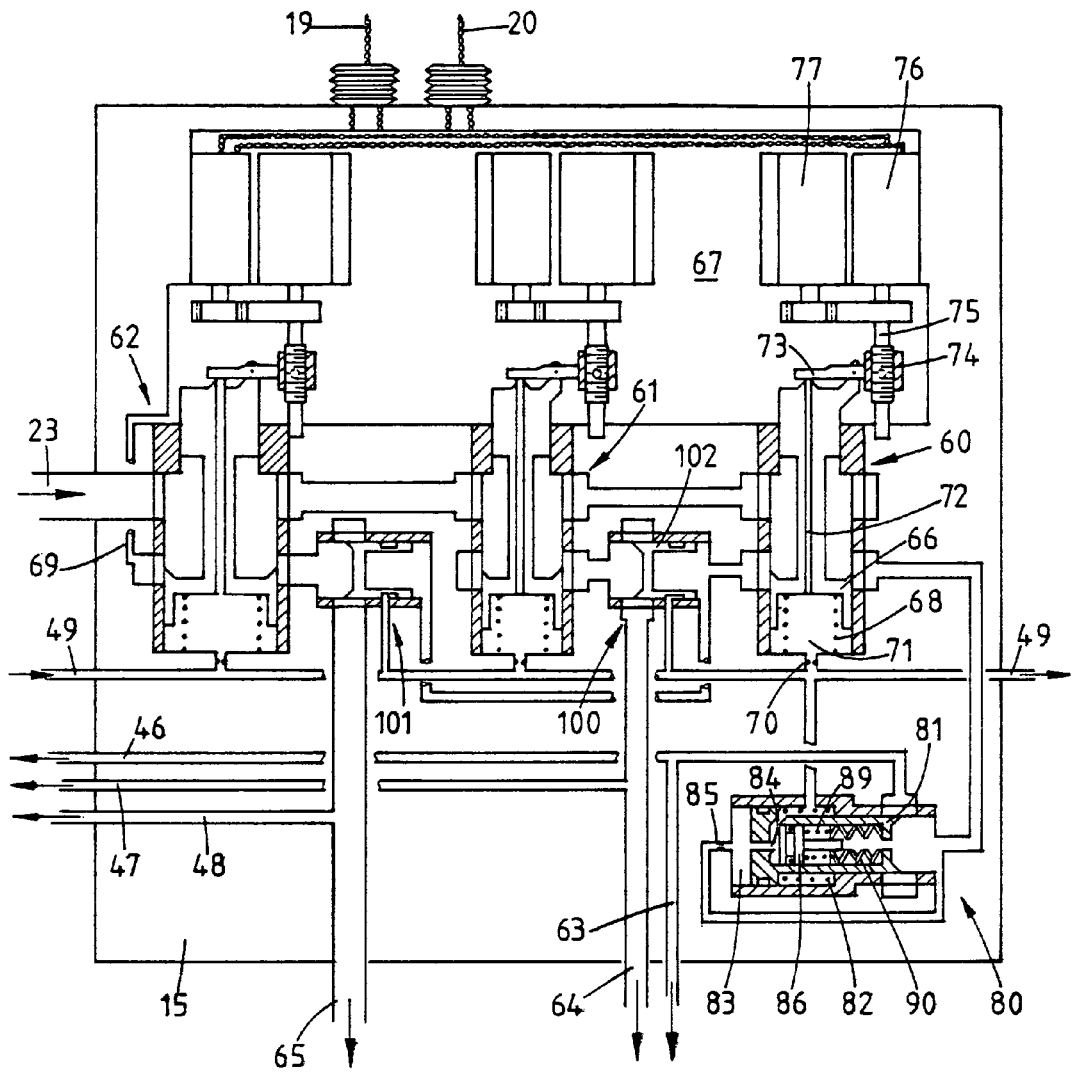
Figure 4:
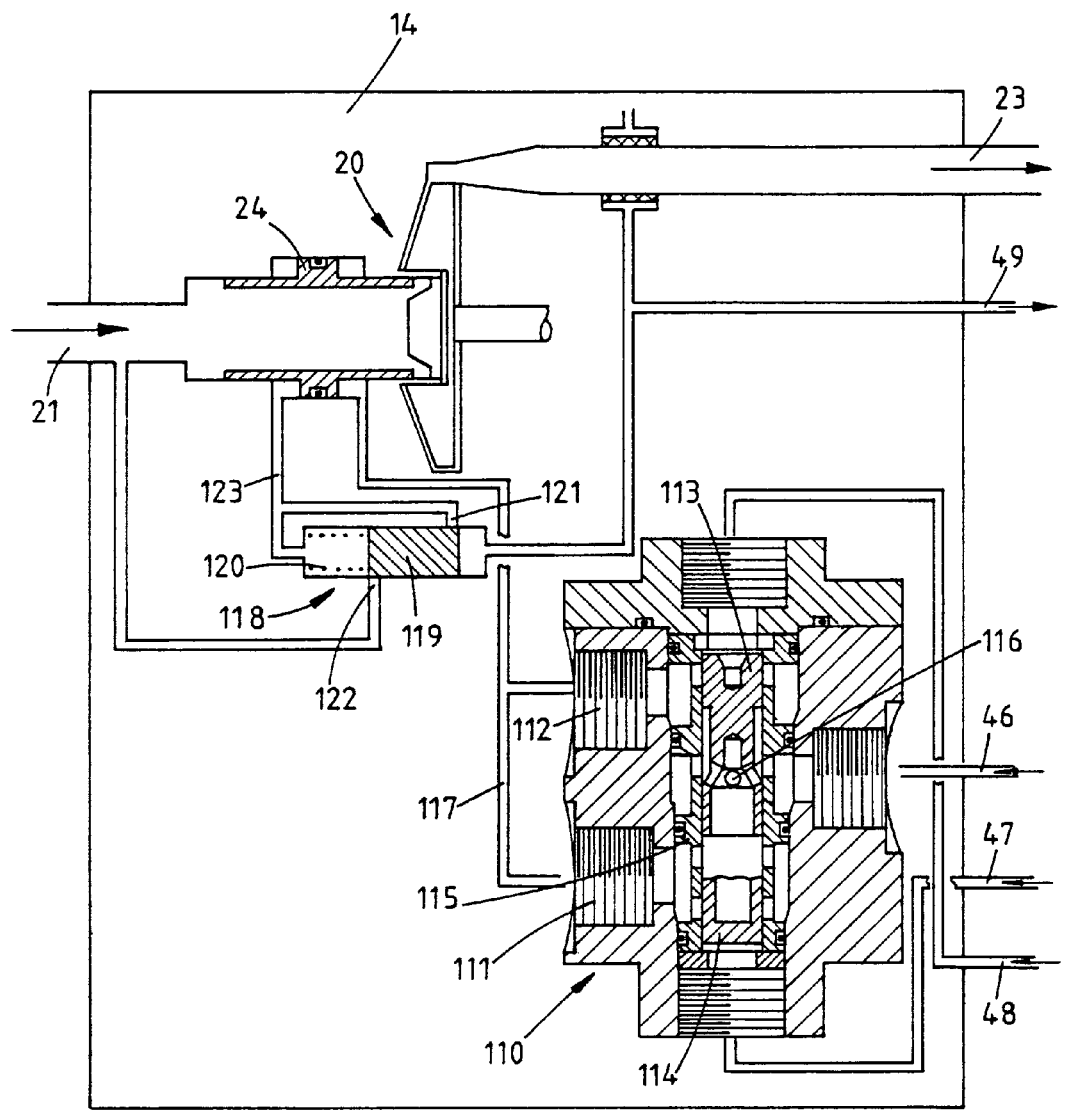
Figure 5:
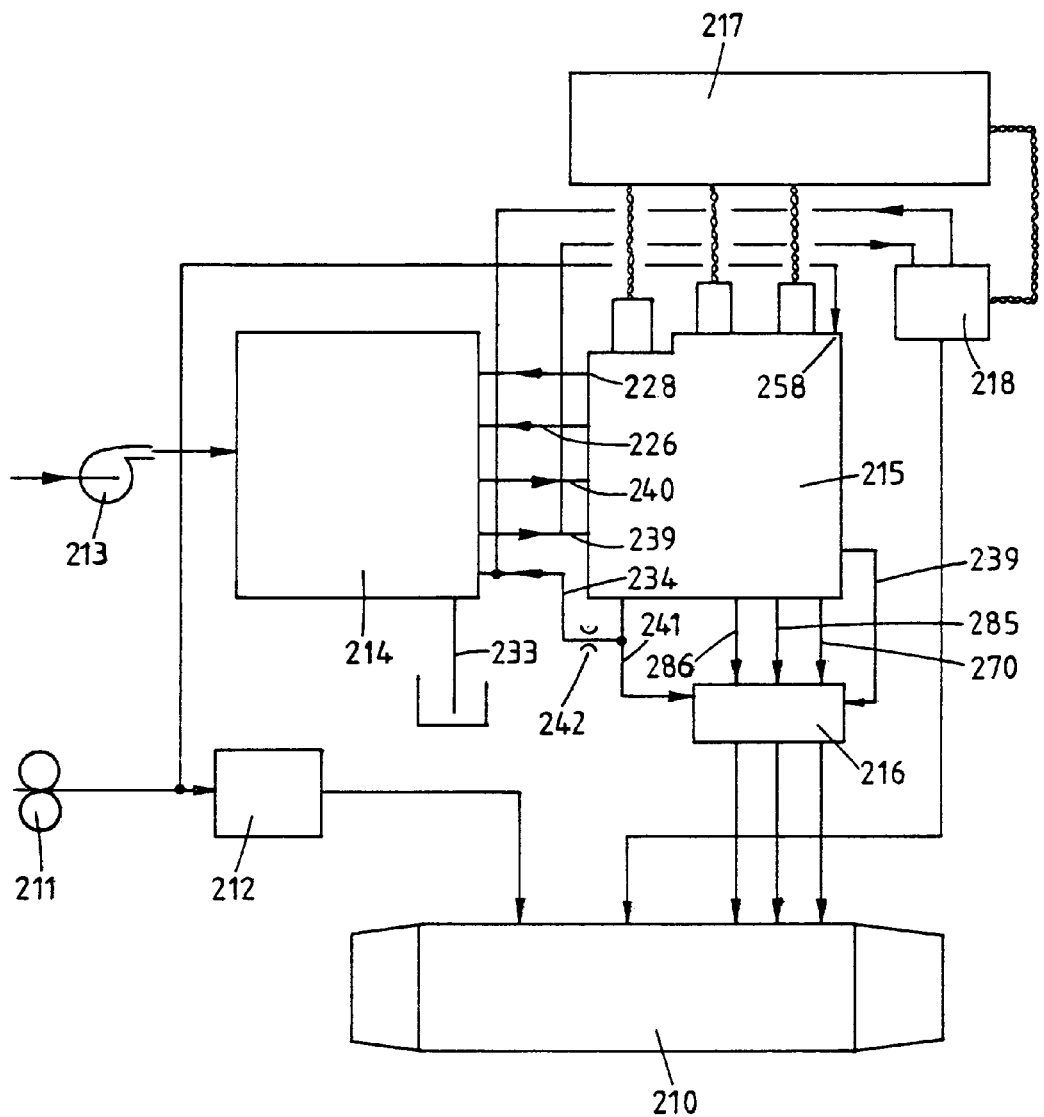
Figure 6:
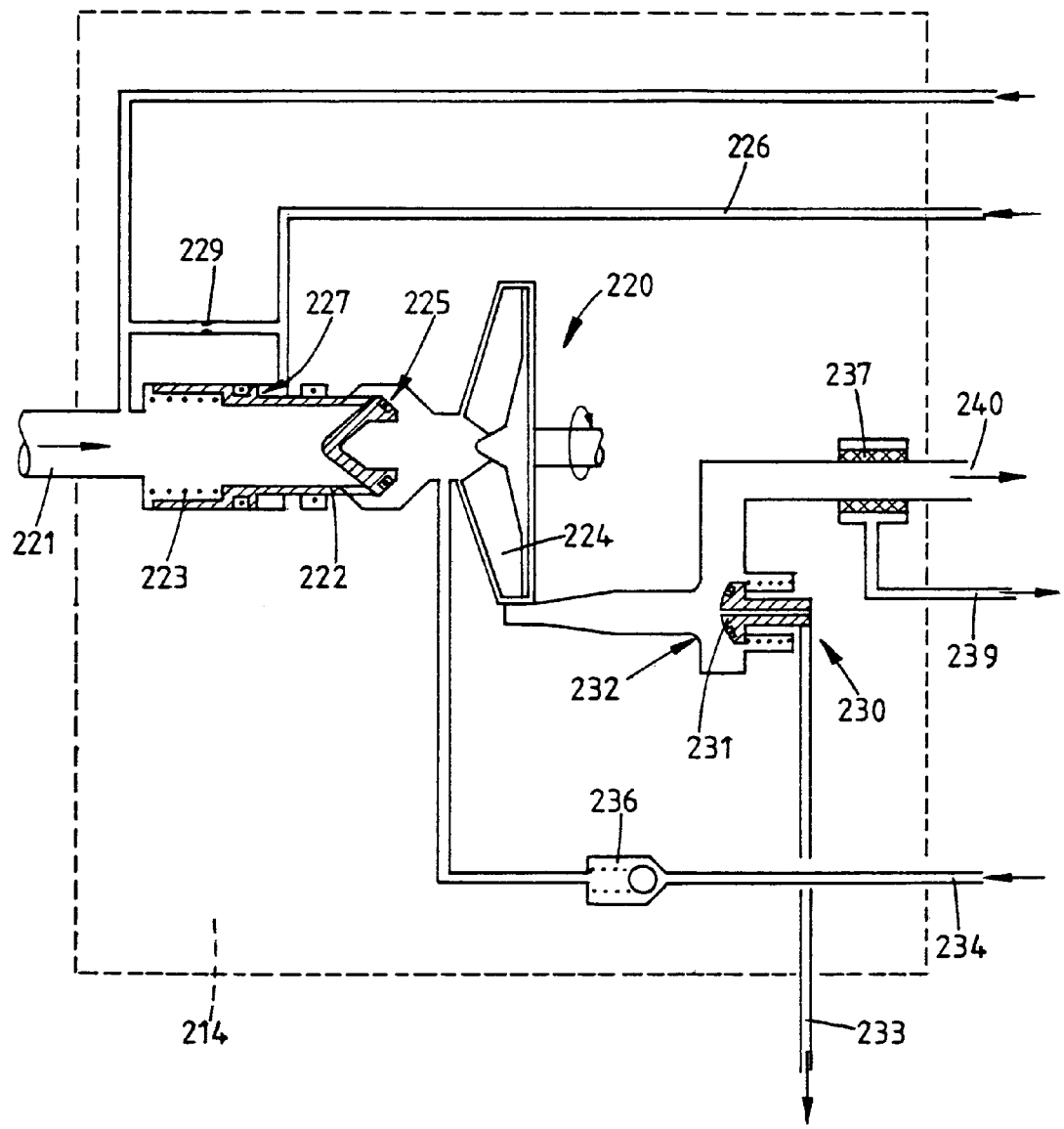
Figure 7:
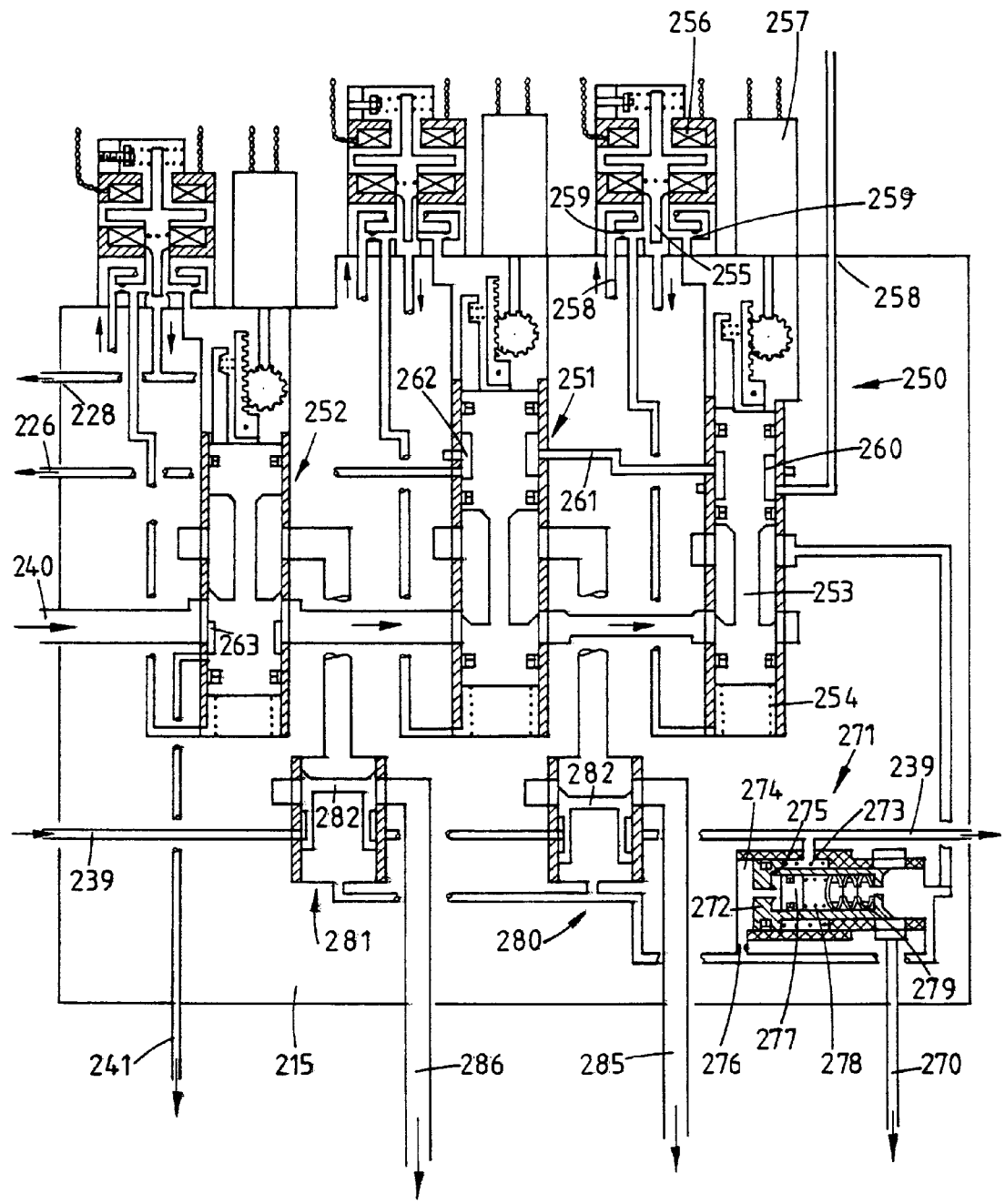
Figure 8:
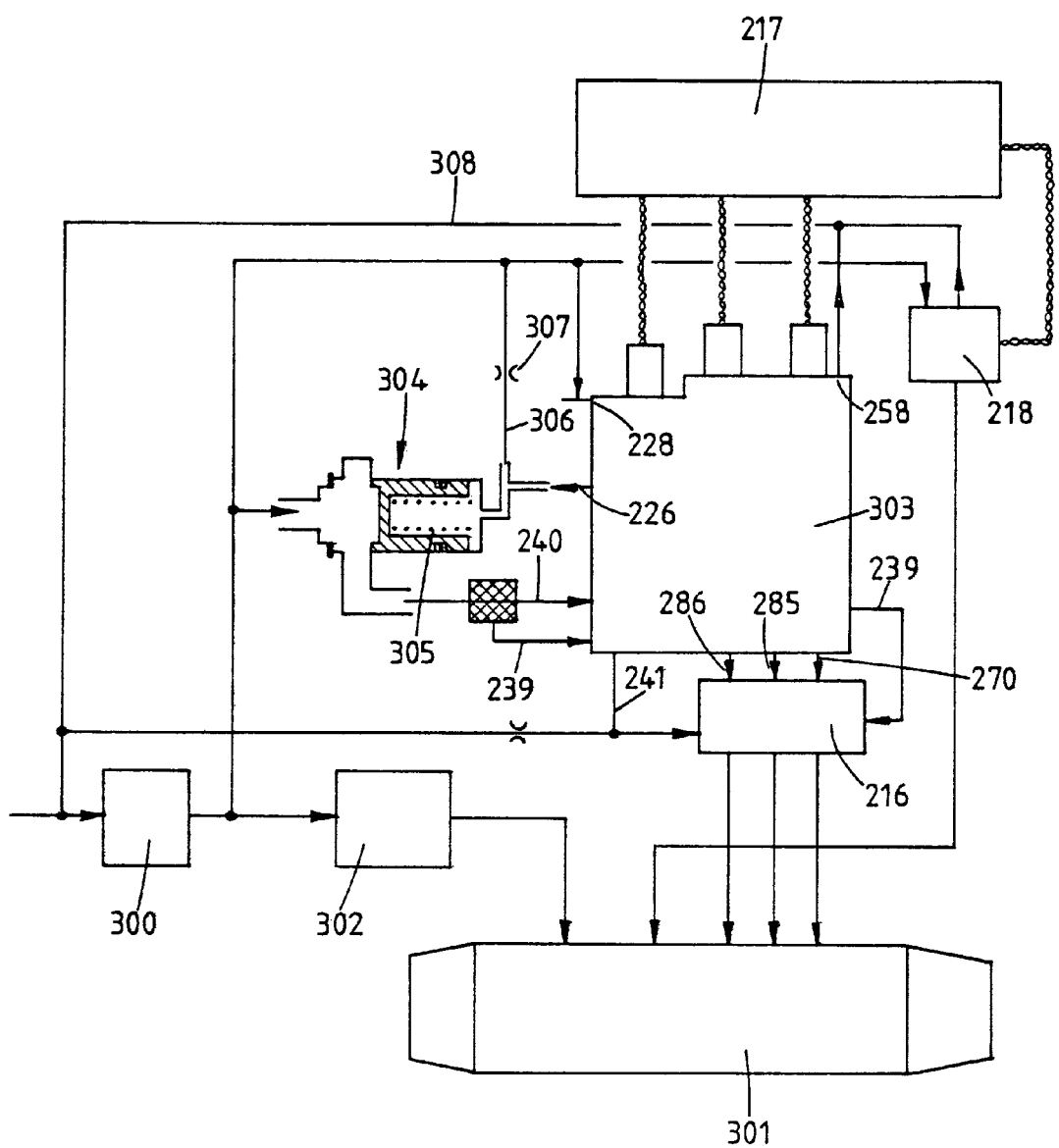

FIG. 1 is a block diagram showing a gas turbine engine and a reheat fuel control system, FIG. 2 is a diagram of a pump unit forming part of the system of FIG. 1, FIG. 3 is a diagram of a metering unit forming part of the system of FIG. 1, FIG. 4 is a diagram of an alternative form of pump unit, FIG. 5 is a block diagram of an alternative arrangement of a gas turbine engine and reheat fuel control system, FIG. 6 is a diagram of a pump unit forming part of FIG. 5, FIG. 7 is a diagram of a metering unit forming part of FIG. 5, and FIG. 8 is a block diagram of a further alternative arrangement of a gas turbine engine and reheat fuel control system.

It should be noted that FIGS. 1, 2 and 3 are to be read in conjunction, identical parts having corresponding reference numerals.

As shown in FIG. 1 a gas turbine engine 10 is supplied with fuel from a pump 11 by way of a variable metering device 12 which may be of a known type and which does not form part of the present invention. The engine 10 includes reheat apparatus of a known type and has core, bypass and primary burners, as above defined. Fuel is supplied to the reheat burners from a low pressure pump 13 by way of a main pump unit 14, a metering unit 15 and a shut-off valve arrangement 16. The pump unit 14 and metering unit 15 are controlled by a computer device 17 which supplies signals on lines 18, 19, 20 to the pump unit 14 and metering unit 15. The device 17 may be of any conventional form and is responsive to operating conditions of the engine 10 to generate control signals for the reheat system. A known type of combined valve and accumulator unit 31, commonly referred to as a "hot shot" unit, is responsive to a signal from the device 17 to deliver measured amounts of additional fuel to the main burners of the engine 10 and to a location between the main burners and reheat burners, thereby initiating a streak of flame which will ignite the reheat burners.

One embodiment of the pump unit 14 is shown in detail in FIG. 2 and comprises a pump 20 which receives fuel on a line 21 from the low pressure pump 13 and delivers this fuel by means of a bladed impeller 22 to an outlet passage 23. The pump 20 has an inlet throttle 24 which incorporates a double-acting piston portion urged in opposite directions by pressures in lines 25, 26 respectively. The pressure in line 25 urges the throttle 24 towards a shut position and can be derived from pressure in a line 27 from the outlet of pump 11, by way of a selector valve 28, the latter being shown in a state corresponding to operation of the reheat system.

One end of the selector valve 28 is operated on by pressure in a line 29, derived from the pressure in line 27 by a flapper valve 40 actuated by a twin coil latching torque motor 41 which is energised from the computer device 17. In the position of the flapper valve 40 shown in the drawing, the pressure in line 27 is applied to the line 29 to urge the valve 28 against a spring 42 to connect the outlet passage 23 to line 25. The other end of the valve 28 is subjected to the low pressure at the inlet of pump 13, by way of a line 43.

In the operating condition (shown) of the valve 28 the pressure in line 27 is also applied to a line 44. The pressure in line 26 is derived by means of a valve 45 from that in line 44 and also from the pressure in a line 30 which is connected to the inlet of the pump 20. The valve 45 is responsive to the highest of the pressure in any of three lines 46, 47, 48 from the metering unit 15, these pressure being obtained in a manner to be described. The valve 45 is also responsive to the pressure in the pump outlet passage 23, by way of a line 49. The valve 45 comprises a spool 50 movable against the pressure in passage 23 by the pressure in line 46. The spool 50 is also movable against the pressure in passage 23 by a shuttle 51 which can abut the spool 50 and is responsive to a difference between the pressures in lines 46, 47. The spool 50 is also movable against the pressure in passage 23 by a plunger 52 which can abut the shuttle 51 and is responsive to a difference between the pressures in lines 47, 48. Spool 50 has metering edges which control flow between the lines 44 and 30, the pressure in the line 26 being intermediate the pressures in lines 44 and 30.

In the leftward position (as viewed in the drawing) of the flapper valve 40 the pressure in line 29 falls to the low level present in line 43 and the valve 28 is moved leftward by the spring 42 to connect line 25 to the high pressure in line 27. The throttle 24 is therefore urged shut. The outlet passage 23 is connected to the line 43 by way of an axial bore 53 in the valve 28 and the line 44 is isolated from the line and is connected to the line 43. The drop in pressure in the passage 23 allows the spool 50 to be moved leftward by a spring 54 so that line 26 is connected to line 44 which is now at low pressure.

The metering unit 15 shown in detail in FIG. 3 includes three metering valves 60, 61, 62 for controlling fuel flows through delivery passages 63, 64, 65 respectively to the primary, core and bypass burners. The valves 60, 61 and 62 are substantially identical differing only in their dimensions and only the valve 60 will be described in detail. The valve 60 has a control element 66 having two portions of differing effective areas such that the element 66 is urged towards an open position by the pressure in passage 23 and in a chamber 67. The element 66 is biased against these pressures by a spring 68. The chamber 67 is connected to the downstream side of the valve 62 by a passage 69. The line 49 communicates via a series arrangement of a fixed restrictor 70, a chamber 71, an axial passage 72 in the element 66 and a servo pressure regulating valve 73 with the chamber 67. The valve 73 comprises a lever pivotally mounted on the element 66 and movable by a collar 74 threadedly engaging a stem 75 which is rotatable by a stepping motor 76, the latter being responsive to signals from the computer device 17. Downward movement of the collar 74 by the motor 76 opens the valve 73, reducing pressure in the chamber 71 and causing the element 66 to move downwards to increase fuel flow. With the collar 74 stationary this downward movement of the element 66 reshuts the valve 73 to arrest further movement of the element 66. The arrangement thus provides a follow-up servo so that the position of element 66 corresponds to the operating position of the stepping motor 76, and the control element 66 adopts an equilibrium position in which the forces from the spring 68 and the pressure in chamber 71 balance the forces applied by the pressures in passage 23 and chamber 67. A resolver 77 is drivingly connected to the stepping motor 76 and provides signals to the computer device 17 indicative of the operating position of the motor 76.

The outlet of the valve 60 communicates with the delivery passage 63 by way of a servo pressure operated valve 80 which is responsive to a difference between the pressures at the inlet, and outlet of the valve 60. The valve 80 comprises a control element 81 biased to an open position by a spring 82 and is responsive to a servo pressure in a chamber 83 which lies between a variable orifice 84 and a fixed restrictor 85. Flow through the orifice 84 is controlled by a plunger 86 which is urged in opposite directions by the pressures in line 49 and at the outlet of the valve 60. The plunger 86 is biased against the pressure in line 49 by a spring 89 and a stack 90 of temperature-responsive spring washers. Since the pressure in line 49 is equal to that in the passage 23, the plunger 86 is responsive to the pressure difference across the valve 60. The servo pressure in chamber 83 and the position of the control element 81 will thus correspond to this pressure difference. The arrangement is such that an increase in the aforesaid pressure difference causes the plunger to move against the spring 89, increasing flow through the orifice 84 and hence increasing the pressure in chamber 83. The control element 81 then follows the plunger 86 and reduces flow through the valves 80 and 60 thereby reducing the pressure difference across the valve 60. The valve 80 acts conversely to raise a reduced pressure difference across the valve 60. The pressure difference across the valve 60 is thereby maintained substantially constant.

Identical throttle valves 100, 101 are provided downstream of the valves 61, 62 respectively. The valves 100, 101 have a control member 102 responsive to the pressures downstream of the respective valves 61, 62 and also to the pressure downstream of the valve 60. The arrangement is such that the pressures downstream of the valve 61, 62 are maintained equal to that downstream of the valve 60. Since the pressures upstream of the valves 60, 61, 62 are identical, the pressure differences across all of the metering valves are maintained equal.

The lines 46, 47, 48 communicate with respective delivery passages 63, 64, 65. The valve 48 (FIG. 2) is thereby responsive to whichever of the delivery pressures is the highest and hence provides a servo pressure in the line 26 which is dependent on the lowest pressure difference across the three series arrangements of metering valves 60, 61, 62 and their associated throttle valves 80, 100, 101. An increase in this highest delivery pressure results in a rise in the servo pressure in the line 26, increasing the delivery pressure of pump 20. In use, the pressure in the pump delivery passage 23 is applied to line 25 and a rise in this pressure urges the inlet throttle 24 against the pressure in line 26 until a new equilibrium position is attained in which the pressure difference in metered flow to the burners is restored to its original level. Since the pump 20 has a vapour core, its delivery pressure rises relatively slowly in response to movement of the throttle 24 to increase fuel flow. However, since the line 25 is connected in normal operation with the pump outlet passage 23, as soon as the inlet throttle 24 moves leftwards, as viewed in FIG. 2, it displaces fuel through the line to the outlet passage 23, providing an immediate increase in flow in the passage 23 which largely compensates for the slow rise in delivery pressure of the pump 20.

It will be seen that when the pressure in the passage 23 is reduced as a result of shut-down of the pump 20 (FIG. 2) by the devices 40, 28, this reduction and the consequent fall in pressure in chambers 67, 71 allows the spring 68 to shut the valve 60, the valves 61, 62 being shut by similar means.

The shut-off valve arrangement 16 (FIG. 1) is responsive to the pressure in the line 29, so that when this pressure is high the three valves in the arrangement 16 are open and, as seen from FIG. 2, the pressure in line 29 is high at all times when the flapper valve 40 is in a position which corresponds to a requirement to operate the reheat system.

FIG. 4 shows an alternative form of pumping unit 14, in which the pump 20 is identical with the pump 20 described in FIG. 2. A valve 110 is, however, substituted for the valve 45 and has three inlets connected to lines 46, 47, 48 respectively, two interconnected outlet ports 111, 112 and two shuttle elements 113, 114 which are slidable in a ported sleeve 115. The shuttle 113 has equal opposed areas responsive to the pressures in lines 46, 48 respectively, the pressure in line 46 reaching radially inner surfaces of shuttle 113 by way of ports 116 therein. Operating areas of the shuttle 114 are responsive to the pressures in lines 46, 47 and if the pressure in line 46 is the highest the shuttle elements 113, 114 are urged apart as shown to connect the line 46 to the outlet port 111.

If the pressure in line 48 is the highest the shuttle 113 is urged into abutment with the shuttle 114 to connect the line 48 with the port 112. If the pressure in line 47 is the highest the shuttle 114 abuts the shuttle 113 to connect the line 47 to the port 111. Pressure in the ports 111, 112 is applied through a line 117 to the throttle 24 of the pump 20 so that the pressure in line 117 can urge this throttle in a direction to increase fuel flow from the pump 20. A further valve 118 has a single shuttle 119 movable against a biasing spring 120 by the pressure in the outlet passage 23 of the pump 20. The shuttle 119 is movable in either direction from an equilibrium position in which it just closes ports 121, 122 and in which the force exerted on the shuttle 119 by the spring 120 and the pressure in line 123 is balanced by the pressure in the passage 22. Port 121 communicates through a line 123 with a side of the throttle 24 so that an increase in pressure in the line 123 urges the throttle 24 to reduce flow through the pump 20. Pressure in line 123 is also applied to the valve 118 so as to assist biasing of the spring 120.

In use an increase in the highest of the pressures in lines 46, 47, 48, corresponding to a fall in pressure difference and hence to a decrease in flow to the corresponding reheat burner, is applied to the line 117 and causes the inlet, throttle 24 to be urged to increase fuel flow from the pump 20, tending to restore the burner flow. The consequent rise in pressure in passage 23 urges the shuttle 119 to uncover port 121 and apply pump delivery pressure to line 123, causing the inlet throttle 24 to adopt a new equilibrium position in which the pressure difference in metered flow to the burner is restored to its original level. If the pressure in passage 23 rises relative to that in line 117 the shuttle 119 is urged against the spring 120, opening the port 122 to urge the throttle to reduce fuel flow until fall in pressure in passage 23 restores the shuttle 119 to its original equilibrium position, holding the throttle 24 in a new equilibrium position at which the reduced pressure in passage 23 is maintained. The arrangement thus provides a substantially constant pressure difference in the flows to each of the burners. As described in connection with FIG. 2 the pump 20 has a large volume and the pressure in the passage 23 rises relatively slowly in response to movement of the inlet throttle 24. Nevertheless the valve 118 causes the position of the inlet throttle 24 to react substantially immediately to changes in pressure in the passage 23.

The alternative arrangement shown in FIG. 5 includes a gas turbine engine 210 having primary, core and bypass reheat burners. Main burners of the engine 210 are supplied with fuel from a pump 211 through a variable metering device 212. Fuel is supplied to the reheat burners from a low pressure pump 213 by way of a main pump 214, a metering unit 215 and a shut-off valve arrangement 216. The metering unit 215 is responsive to electrical signals from a computer device 217 which may be of a conventional type and is responsive to operating conditions of the engine 210 to generate control signals for the system. A hot-shot unit 218, corresponding to the device 31 of FIG. 1, is also responsive to a signal from the unit 217 to deliver measured amounts of additional fuel to the main burners of the engine 210 and to a location between the main burners and the reheat burners, thereby initiating a streak of flame which will ignite the reheat burners.

The pump unit 214 is shown in more detail in FIG. 7 and includes a centrifugal pump 220 which receives fuel on an inlet line 221 from the pump 213. The pump 220 has an inlet shut-off valve 222 which is movable by a spring 223 to isolate the line 221 from the pump impeller 224. The valve 222 has a frusto-conical portion 225 which can engage a complementary seat on the pump body to effect this shut-off.

A control pressure can be applied through a line 226 from the metering unit 215 to a piston face 227 of the valve 222 to open the latter. A connection 228 on the metering unit 215 communicates with the line 226 by way of a flow restrictor 229 and also communicates with the inlet line 221. A drain valve 230 has a closure element 231 which is biased towards engagement with a valve seat 232, in which position fuel from the pump 220 can pass through a bore in the closure 231 to a drain line 233. In operation the closure 231 is urged by pump delivery pressure to a position (shown) in which the stem of the closure 231 shuts off connection with the drain line 233. A line 234 from the metering unit 215 communicates by way of a non-return valve 236 with the chamber of the pump 220 immediately upstream of the impeller 224. As shown in FIG. 6 the line 234 also communicates with a line 241 from the unit 215 by way of a flow restrictor 242.

A filter unit 237 provides a filtered fuel supply from the pump outlet passage 240 on a line 239 to the metering unit 215.

As shown in FIG. 8 the metering unit 215 includes three metering valves 250, 251, 252 for fuel flows to the primary, core and bypass burners respectively, each of these valves receiving fuel from the pump delivery passage 240. The valves 250, 251 are substantially identical, differing only in their dimensions, and of these two valves only the valve 250 will therefore be described in detail. The valve 250 has a control element 253 which is biased towards a shut position by a spring 254 and is subjected at its opposite ends to pressures controlled by a flapper valve 255. The valve 255 is operated by a torque motor 256 which is biased to a central position and which is responsive to current signals from the device 217 (FIG. 6) the position of the control element 253 is fed back to the device 217 by means of a resolver 257.

Fuel flow from the pump 211 is supplied to a connection 258 and the flapper valve 255 simultaneously controls flow from the connection 258 to the connection 228 through two parallel flow restrictors 259 and two opposed orifices, pressure intermediate the restrictors and orifices being applied to opposite ends of the element 253. The element 253 has an annular recess 260 which, when the element 253 is in an open position, connects a high pressure line 258 from the pump 211 to a passage 261. The passage 261 is connected by a similar recess 262 in the valve 251 to the line 226 to apply the high pressure in line 258 to open the shut-off 222 of the pump 220

(FIG. 7). The shut-off valve 222 is thereby urged open only when both of the valves 250 and 251 are open.

The valve 252 corresponds generally to the valves 250, 251 except that in the valve 250 there is no provision for controlling application of pressure to the valve 222. The valve 252 includes an annular recess 263 which, when the valve 252 is open, connects the pump delivery passage 240 with the line 241.

The outlet of the valve 250 communicates with a manifold 270 for the engine primary burners, by way of a servo pressure operated valve 271 which is responsive to a difference between the pressures at the inlet and outlet of the valve 250. The valve 271 comprises a control element 272 biased to an open position by a spring 273 and is responsive to a servo pressure in a chamber 274 which lies between a variable orifice 275 and a fixed restrictor 276. Flow through the orifice 275 is controlled by a plunger 277 which is urged in opposite directions by the pressures in line 239 and at the outlet of the valve 250. The plunger 277 is biased against the pressure in line 239 by a spring 278 and a stack 279 of temperature-responsive spring washers. Since the pressure in line 239 is equal to that in the passage 240, the plunger 277 is responsive to the pressure difference across the valve 250. The servo pressure in the chamber 274 and the position of the control element 272 will thus correspond to this pressure difference. The arrangement is such that an increase in the aforesaid pressure difference causes the plunger 277 to move against the spring 278, increasing flow through the orifice 275 and hence increasing the pressure in the chamber 274. The control element 272 then follows the plunger 277 and reduces flow through the valves 271 and 250, thereby reducing the pressure difference across the valve 250. The valve 271 acts conversely to raise a reduced pressure difference across the valve 250. The pressure across the valve 250 is thereby maintained substantially constant.

Identical throttle valves 280, 281 are provided downstream of the valves 251, 252 respectively. Each of the valves 280, 281 has a control member 282 responsive to the pressures downstream of the respective valves 251, 252 and also to the pressure downstream of the valve 250. The arrangement is such that the pressures downstream of the valves 251, 252 are maintained equal to that downstream of the valve 250. Since the pressures upstream of the valve 250, 251, 252 are identical, the pressure differences across all of the metering valves are maintained equal, in the same way as was described in connection with FIG. 3.

The shut-off valve arrangement 216 (FIG. 1) is downstream of the manifold 270 for the primary burners and also of manifolds 285, 286 for the core and bypass burners respectively, so that all of these manifolds remain full of fuel when the reheat system is shut down, giving a rapid response to subsequent selection of reheat operation by a pilot. The shut-off valves for the primary and core burner flows are opened in response to an increase in pressure in line 239, derived from the outlet of the pump 220 (FIG. 7). The shut-off valves for the bypass burner flow are opened in response to an increase in pressure in line 241 when the valve 252 opens.

At start up of reheat operation the primary and core metering valves 250, 251 are opened in response to signals from the computer device 217, and high pressure from the pump 211 is applied through the line 226 to open the shut-off valve 222 of pump 220. Rise in pressure in line 239 opens the shut-off valves for the primary and core flows in the arrangement 216 (FIG. 1). When the valve 252 opens in response to a signal from the device 217 the pressure rise in line 241 opens the shut-off valve for by-pass flow in the arrangement 216. Since both of the devices 250, 251 must open to cause the valve 230 to open, shutting off either one of the devices 250, 251, for example in an emergency, will shut the valve 230 to arrest fuel flow.

FIG. 9 shows an alternative reheat control system in which a single pump arrangement 300, which may be a centrifugal pump arrangement, supplies fuel to both the main and reheat burners of an engine 301, the main burners being supplied through a variable metering device 302 which forms no part of the present invention. The system includes a reheat metering unit 303 to which fuel from the pump arrangement 300 flows by way of a servo operated shut-off valve 304. The valve 304 is urged open by delivery pressure from the pump arrangement 300 and is urged shut by a spring 305 in combination with a pressure in a line 306, this pressure being derived from pump delivery pressure through a restrictor 307.

The reheat metering unit 303 is structurally identical with the unit 215 described with reference to FIG. 8, and the connections 228, 258 of the unit 303 have been assigned reference numerals identical with those of corresponding connections in the unit 215. The essential difference in the system shown in FIG. 9 is that the connection 258 communicates by way of a low pressure return line 308 with the inlet of the pump arrangement 300 and the connection 228 communicates with the outerlet of the pump arrangement 300. With such a connection when either of the valves 250 or 251 is shut the pressure in line 226 rises to shut off flow through the valve 304. When both of the primary and core metering valves are open the line 226 is connected to the low pressure return line 308 and pump delivery pressure opens the valve 304. The system thereafter operates as described above with reference to FIG. 8. A shut-off valve arrangement 216, a computer device 217 and a hot shot unit 218 are provided, as before.

The invention claimed is:

1. A system for controlling fuel flow to each of a plurality of reheat burners of a gas turbine engine comprising plurality of fuel metering devices for controlling the flow of fuel to the respective burners of the engine, a corresponding plurality of throttle valves in series with respective ones of said metering devices, regulating means associated with one of said throttle valves and responsive to the pressure difference across the said one metering device in series with said one throttle valve for controlling the flow of fuel through the valve so that pressure difference across the said one metering device remains substantially constant, and means responsive to the constant pressure difference across said one metering device to control the flow of fuel through the remaining throttle valves so that the pressure differences across their respective metering devices are substantially equal to that across said one metering device.

2. A system as claimed in claim 1 which includes a pump for supplying fuel to said metering devices, said pump having an inlet throttle and means, responsive to the lower of the metering pressure differences across said metering devices, for varying the fuel flow rate through said pump.

3. A system as claimed in claim 1 or claim 2 in which said metering devices are responsive to respective electrical control signals and which includes means, responsive to a further electrical control signal, for urging said pump inlet throttle fully shut.

4. A fuel supply system for a gas turbine engine, comprising a fuel metering valve, a fuel supply passage communicating with an inlet of said metering valve, a shut-off valve for controlling flow through said supply passage, means responsive to a servo pressure signal for opening said shut-off valve, and means operable by said metering valve in an open position thereof, for supplying said servo pressure signal.

5. A fuel supply system as claimed in claim 4 which includes a pump in said supply passage, said shut-off valve being operable to shut off fuel flow to the inlet of said pump.

6. A fuel supply system as claimed in claim 4 or claim 5 which includes a plurality of said metering valves, two of said metering valves including means, operable by the respective metering valves in the open positions thereof, for supplying said servo pressure signal, said means for supplying the servo pressure signal being connected in series whereby both of said two metering valves must be open to open said shut-off valve.

7. A fuel flow control system including a fuel pumping unit and a unit for metering fuel flow from the pumping unit, said pumping unit including a pump, a throttle valve for increasing or decreasing flow through the pump in response to pressures in first and second chambers respectively, means for deriving the pressure in said first chamber from a pressure downstream of said metering unit, and a shuttle valve for regulating pressure in said second chamber in response to pressure at the outlet of said pump, said shuttle valve having ports communicating with said second chamber and with a low pressure connection respectively, a shuttle movable against a biasing spring and the pressure in said second chamber by the pressure in said pump outlet.

8. A fuel flow control system as claimed in claim 7 in which said metering unit includes a plurality of metering valves independently supplied with fuel from said pump outlet and said means for deriving the pressure in said first chamber is operable to derive the second chamber pressure from whichever of the pressures downstream of said metering valves is the highest.

* * * * *